(12) United States Patent
Monnerie (10) Patent No.: US 8,107,551 B2
(45) Date of Patent: Jan. 31, 2012

(54) SYSTEMS AND METHODS FOR SIGNAL MODULATION AND DEMODULATION USING PHASE

(75) Inventor: Emmanuel Monnerie, Suwanee, GA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 562 days.

(21) Appl. No.: 12/334,997

(22) Filed: Dec. 15, 2008

(65) Prior Publication Data

US 2009/0154589 A1 Jun. 18, 2009

Related U.S. Application Data

(60) Provisional application No. 61/013,723, filed on Dec. 14, 2007.

(51) Int. Cl.
H03K 7/10 (2006.01)

(52) U.S. Cl. ........ 375/269; 375/260; 375/267; 375/272; 375/273; 375/274; 375/275; 375/303; 375/316; 375/324; 375/334; 375/340

(58) Field of Classification Search .................. 375/150, 375/216, 336, 260, 267, 269, 272, 273, 274, 375/275, 303, 316, 323, 324, 334, 340; 370/203–210
See application file for complete search history.

(56) References Cited

U.S. PATENT DOCUMENTS

| | | | |
|---|---|---|---|
| 5,654,982 A * | 8/1997 | Goodson et al. | 375/222 |
| 5,959,965 A * | 9/1999 | Ohkubo et al. | 370/203 |
| 5,974,094 A | 10/1999 | Fines et al. | |
| 6,456,644 B1 | 9/2002 | Ramberg et al. | |
| 7,154,875 B2 | 12/2006 | Masui et al. | |
| 7,154,956 B2 | 12/2006 | Molisch et al. | |
| 7,349,483 B2 * | 3/2008 | Seki et al. | 375/260 |
| 7,643,537 B1 | 1/2010 | Giallorenzi et al. | |
| 7,724,812 B2 * | 5/2010 | Xia | 375/226 |
| 2004/0114670 A1 | 6/2004 | Cranford, Jr. et al. | |
| 2004/0127162 A1 | 7/2004 | Maki et al. | |
| 2009/0161732 A1 | 6/2009 | Miller et al. | |

OTHER PUBLICATIONS

U.S. Appl. No. 12/325,412, filed Dec. 1, 2008, Monnerie.
Chan, et al., "Comparison of Two FFT-Based Demodulation Schemes for M-ary FSK", *MILCOM '92 Conference Record 'Communications—Fusing Command, Control and Intelligence, IEEE* Oct. 11, 1992, 603-607 vol. 2. Ferland, et al., "On the Implementation of a 32-Channel FFT-Based MFSK Demodulator", *IEEE Conference Proceeding on Electrical and Computer Engineering* Jan. 1, 1994, 186-189 vol. 1.
U.S. Appl. No. 12/325,412, Office Action mailed on Jun. 20, 2011, 8 Pages.
U.S. Appl. No. 13/325,412, Amendment and Response to Non-Final Office Action, filed Jul. 1, 2011, 16 pages.

* cited by examiner

*Primary Examiner* — Dhaval Patel
(74) *Attorney, Agent, or Firm* — Kilpatrick Townsend & Stockton LLP (57) ABSTRACT

Certain embodiments provide a system for recovering data from at least one signal. The system can include an analog-to-digital converter (ADC) and in-phase/quadrature (IQ) generator component that can sample a signal recovered from a communication medium to generate a first signal sample and a second signal sample. A Fast Fourier Transform (FFT) component can process the first signal sample to generate a first signal phase and process the second signal sample to generate a second signal phase. A phase difference calculation component can determine a phase difference between the first signal phase and the second signal phase, determine a bit value represented by the signal based on the phase difference, and output the bit value to an end device coupled to the phase difference calculation component.

20 Claims, 6 Drawing Sheets

SYSTEMS AND METHODS FOR SIGNAL MODULATION AND DEMODULATION USING PHASE

CROSS REFERENCE TO RELATED APPLICATIONS

This application claims priority to U.S. Provisional Patent Application No. 61/013,723, filed Dec. 14, 2007 and entitled "Systems and Methods for Signal Modulation and Demodulation Using Phase," the entirety of which is hereby incorporated by reference.

FIELD OF THE DISCLOSURE

The present disclosure relates generally to data communication systems and, more specifically, to various systems and methods for modulating and demodulating signals using phase.

BACKGROUND

Communication systems allow information to be transmitted from one location to another via a communication medium. The communication medium may be bounded, such as a wireline medium, or unbounded, such as a wireless medium. A communication system can include (1) a transmitter that modulates information onto a carrier wave and transmits it on the communication medium and (2) a receiver that receives the carrier wave and demodulates the signal to obtain the information. Various signal processing techniques can be used to modulate information onto a carrier wave and demodulate the signal to obtain the information.

Some such techniques include modulating and demodulating digital information. An example of a technique for modulating and demodulating digital information is multiple frequency-shift keying (M-FSK). M-FSK is form of frequency-shift keying (FSK). FSK is a method for transmitting digital information in which a waveform at a first frequency represents digital 0 and a waveform at a second frequency represents digital 1. M-FSK utilizes two or more tones to transmit the digital information. Another technique for modulating and demodulating digital information is orthogonal frequency division multiplexing (OFDM). OFDM is a method for transmitting digital information in which a relatively large number of orthogonal sub-carriers are modulated at a relatively low symbol rate. OFDM offers the ability to use many slowly modulated narrowband signals to transmit data even when conditions in the communication medium and channel are undesirable.

These and other modulation techniques may be demodulated and/or analyzed using a Fast Fourier Transform (FFT) algorithm. The FFT algorithm can be used to measure frequency of a signal by measuring the magnitude, or the amount of energy, within a signal and/or samples of a signal. A channel that provides the highest magnitude indicates a value of the signal frequency, and thus a value for the data being transmitted.

Some communication systems utilize two or more different modulation techniques to support data communication. A receiver may receive two or more data signals from one or more transmitters, where each data signal is modulated using different modulation techniques. For example, one data signal may be modulated using an M-FSK modulation technique and a second data signal may be modulated using an OFDM modulation technique. Some communication systems provide the capability of receiving signals simultaneously. Conventional receivers require several components to perform demodulation techniques on two data signals received at the same time. Furthermore, some conventional receivers require separate components to perform demodulation on data signals modulated using different modulation techniques, even requiring multiple demodulators and FFT components to determine a frequency or magnitude. Some receivers experience difficulty in simultaneously receiving and processing a plurality of signals transmitted using the same modulation technique. Accordingly, systems and methods are desirable that can process signals without requiring such additional components.

SUMMARY

In an embodiment, a system is provided for recovering data from at least one signal. The system can include an analog-to-digital converter (ADC) and in-phase/quadrature (IQ) generator component that can sample a signal recovered from a communication medium on which the signal is propagating to generate a first signal sample and a second signal sample. The system can also include a Fast Fourier Transform (FFT) component coupled to the ADC and IQ generator component. The FFT component can process the first signal sample to generate a first signal phase and process the second signal sample to generate a second signal phase. The system can also include a phase difference calculation component coupled to the FFT component. The phase difference calculation component can determine a phase difference between the first signal phase and the second signal phase, determine a bit value represented by the signal based on the phase difference, and output the bit value to an end device coupled to the phase difference calculation component.

This illustrative embodiment is mentioned not to limit or define the invention, but to provide examples to aid understanding thereof. Other aspects, advantages, and features of the present invention will become apparent after review of the entire application, including the following sections: Brief Description of the Drawings, Detailed Description, and Claims.

DETAILED DESCRIPTION

Introduction

Certain aspects and embodiments of the present invention provide a communication system that is configured to modulate and/or demodulate signals using phase information and reduce the number of components necessary to provide desired signal processing capabilities. In some embodiments of the present invention, the receiver is configured to receive a signal that includes digital data and sample it to generate two or more signal samples. A Fast Fourier Transform (FFT) can be performed on each of the two or more signal samples to obtain signal attributes such as phase information. The phase of each of the two or more signal samples can be used to determine the digital data within the signal.

Certain embodiments of the present invention are configured to receive and demodulate two or more separate data signals at substantially the same time and/or are configured to simultaneously receive two or more signals modulated using different techniques.

Illustrative System Implementation

A communication system according to some embodiments of the present invention includes transmitters located remotely from a receiver that can communicate wirelessly with the transmitters. The transmitters may be associated with end point devices that supply data to the transmitters to be communicated to the receiver. The data may be any type of information. An example of data includes resource consumption at utility meters, such as electricity meters located at electricity customers. The end point devices gather data and periodically transmit the data to the receivers using modulation techniques such as M-FSK and OFDM.

Figure 1:
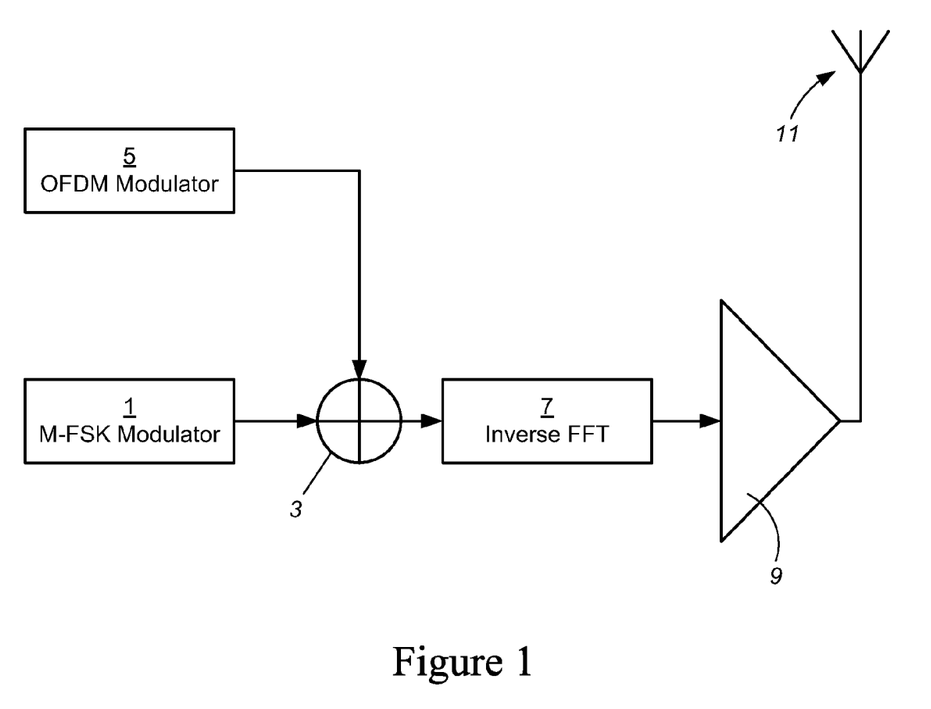
FIG. 1 is a block diagram of a transmitter in accordance with one embodiment of the present invention.

The transmitter can include modulation components configured to modulate signals using one or more modulation techniques. Transmitters according to some embodiments of the present invention include both an OFDM modulator and an M-FSK modulator that are configured to modulate different signals at the same or a different time. FIG. 1 illustrates one embodiment of a transmitter that may used to transmit signals via one or more modulation techniques according to some embodiments of the present invention. The transmitter in FIG. 1 includes an M-FSK modulator 1 that can modulate data signals using M-FSK modulation techniques onto a carrier wave. The M-FSK modulation techniques may include using phase to create a complex representation of data in a signal. The M-FSK modulated signal may be provided to an adder 3. The adder 3 can combine a signal modulated using a different technique with the M-FSK modulated signal. For example, the transmitter includes an OFDM modulator 5 that can modulate data using OFDM modulation techniques and provide the OFDM modulated signal to the adder 3. The adder 3 can combine the OFDM modulated signal with the M-FSK modulated signal. The combined signal is then provided to an Inverse Fast Fourier Transform component (IFFT) 7. The IFFT component 7 can transform the combined signal from the frequency domain to the time domain to facilitate transmission into the communication medium. The combined signal is amplified by amplifier 9 and provided to an antenna 11. The antenna 11 can be configured to radiate the signal energy into a communication medium such as air. In some embodiments of the present invention, a cable may replace the antenna 11 and connect the transmitter with the receiver via a bounded communication medium.

The receiver demodulates the received signals to obtain data represented by those signals. The receiver can be configured to receive and demodulate two or more different types of signals and measure signal attributes to extract data from those signals. In some embodiments of the present invention, the receiver includes components that can perform an FFT algorithm on the received signal to demodulate it and determine phase information. Phase information associated with two or more outputs from the FFT algorithm may be used to determine data within the signal.

Figure 2:
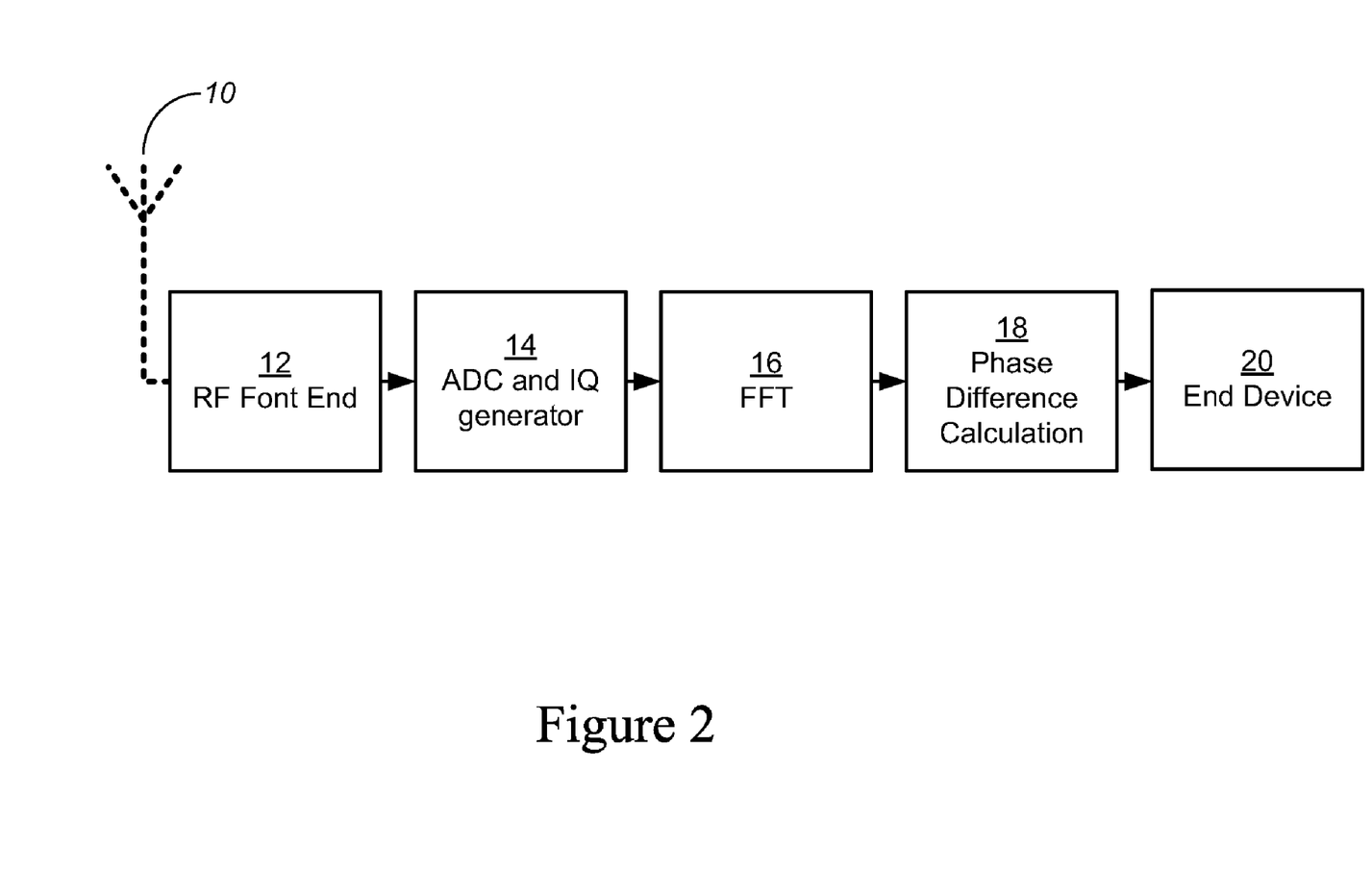
FIG. 2 is a block diagram of a receiver in accordance with one embodiment of the present invention.

FIG. 2 illustrates one embodiment of receiver components that can be used to demodulate signals according to some embodiments of the present invention. The receiver components include an antenna 10 for detecting signals transmitted wirelessly. In some embodiments of the present invention, signals are transmitted to the receiver via wireline with a cable replacing the antenna to connect the receiver to the transmitter. Each signal may include one or more bits of data, such as a digital bit value.

Once the signals are received, they can be amplified or filtered using a receiver front end, such as RF front end 12. The signals may then be provided to an analog-to-digital converter (ADC) and in-phase/quadrature (IQ) generator component 14 that samples the signal at a pre-set rate. In some embodiments of the present invention, the output of the ADC and IQ generator component 14 is a first signal sample having a first signal phase and a second signal sample having a second signal phase. The ADC and IQ generator component 14 can obtain any number of signal samples from the received signals based on the number of times it samples the received signal. For example, the ADC and IQ generator component 14 may be programmed or otherwise controlled to sample a received signal a pre-set number of times represented by a sampling rate.

The output signal samples of the ADC and IQ generator component 14 are provided to an FFT component 16. The FFT component 16 can include components that perform an FFT algorithm on the signal samples and provide FFT outputs based on the signal samples. The FFT outputs may be used to determine signal attributes associated with the received signal. These signal attributes can include phase information for each received signal. A phase difference calculation component 18 can analyze the FFT outputs to determine the phase information and use it to determine a bit value included in the signal in accordance with some embodiments of the present invention. The bit value can be provided to an end device 20 that can interpret and/or store the bit value. Examples of end device 20 include a computer processor, such as a digital signal processor, and a storage device, such as optical, magnetic, or temporary storage devices.

Illustrative Methods for Communicating Data

Figure 3:
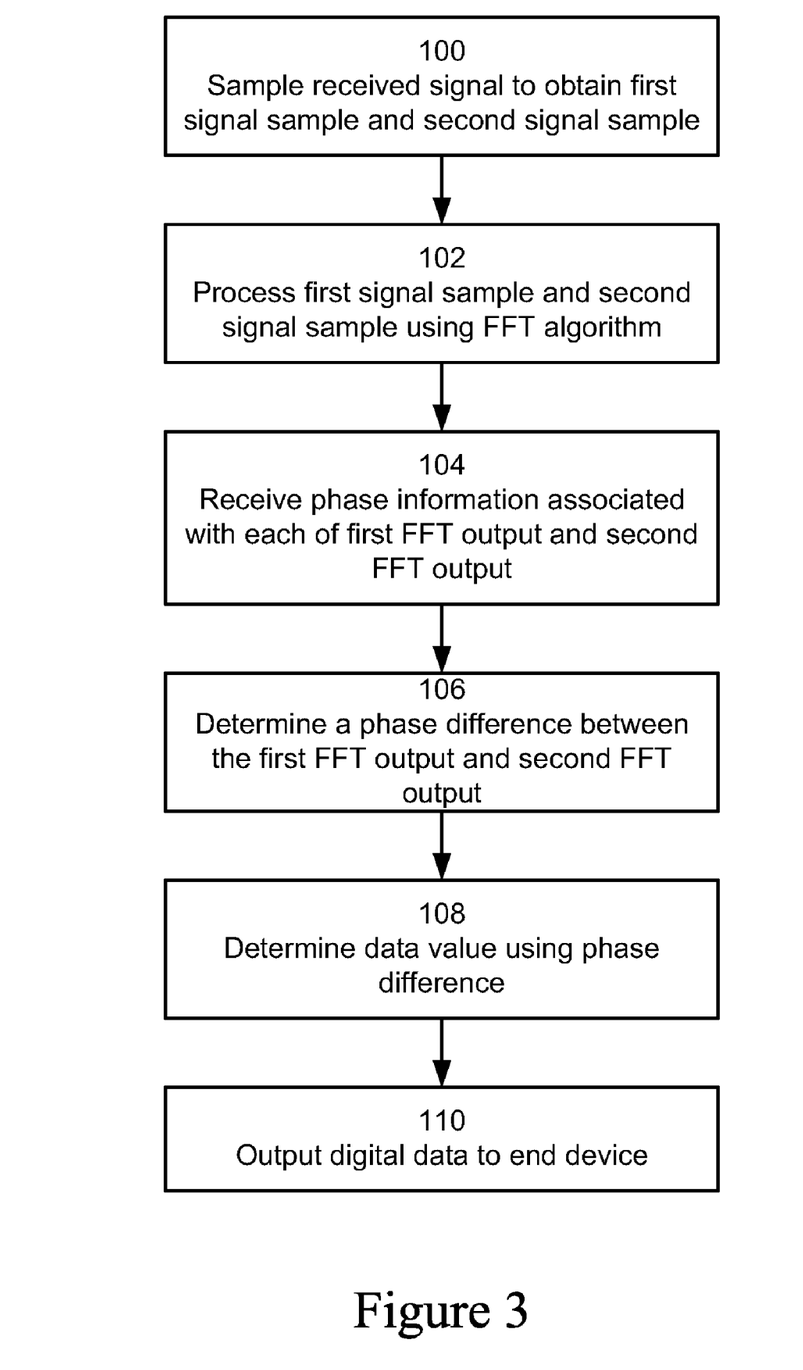
FIG. 3 is a flow chart of a method for determining phase differences between two FFT outputs in accordance with one embodiment of the present invention.

FIG. 3 illustrates a method for determining phase information associated with a received signal using an FFT in accordance with one embodiment of the present invention. The method shown in FIG. 3 is described with reference to the receiver components shown in FIG. 2 for illustrative purposes only. The method of FIG. 3 can be performed using different or other types of receiver components than those shown in FIG. 2.

The method begins at block 100 when the ADC and IQ generator component 14 samples the received signal to obtain a pre-set number of signal samples. For simplicity, a signal sample number of two (first and second signal samples) is used to illustrate one embodiment of the method. Any number of signal samples may be implemented. For example, some embodiments of the present invention use ten signal samples and attributes of each signal sample to determine the data transmitted by the received signal. A signal sample may be a complex digital signal that can be represented using the following relationship:

$$S(n) = A \cdot e^{j\left(2\pi \frac{f}{f_s} n + \psi\right)}$$

Where:
S(n) is the sampled digital signal;
A is the signal magnitude;
f is the signal frequency;
$f_s$ is the sampling frequency;
n is the digital sample index; and
ψ is the signal phase.

The ADC and IQ generator component 14 may then provide the signal samples to the FFT component 16.

In block 102, the first and second signal samples are processed by the FFT component 16. An FFT algorithm can be performed on each signal sample. For example, the FFT algorithm performed on signal sample X for a channel number of k (where k=0 to N−1) may result in information that can be represented using the following relationship:

$$X(k) = \sum_{n=0}^{N-1} S(n) \cdot W_N^{k \cdot n}$$

Where:

$$W_N = e^{-j\frac{2\pi}{N}}; \text{ and}$$

N is the size of the FFT component.

The FFT component 16 performs the above-identified algorithm on one or more signal samples to generate FFT outputs, such as a first FFT output and a second FFT output. The FFT outputs can be used to determine signal attributes. The signal attributes can include each signal sample's frequency, amplitude, and/or phase. One example of an FFT output can be presented in terms of (X,Y) values using the following relationships:

$X = M \cdot \cos(A)$; and $Y = M \cdot \sin(A)$, where:
M is the magnitude of the FFT output; and
A represents the angle and angle attributes, such as phase.

In block 104, the phase difference calculation component 18 receives phase information associated with each of the first FFT output and second FFT output from the FFT component 16. The phase information can be determined using the FFT component 16 in accordance with the relationships described above. In some embodiments, phase information is extracted from the signal attributes associated with the FFT outputs provided from the FFT component 16. For example, the signal attributes may be tagged with a bit of data indicating the type of attribute it represents. The phase information for each signal can be tagged with a bit that identifies the information as phase information and/or identifies the signal for which the phase information relates. The phase information for each signal may be identified and obtained using the tags. In some embodiments, the angle, A, is determined by computing the arctangent of Y/X, using the relationships for X and Y above. In other embodiments, a sinusoid of the difference of angle, A, with a previously obtained angle in time, is determined.

Figure 4:
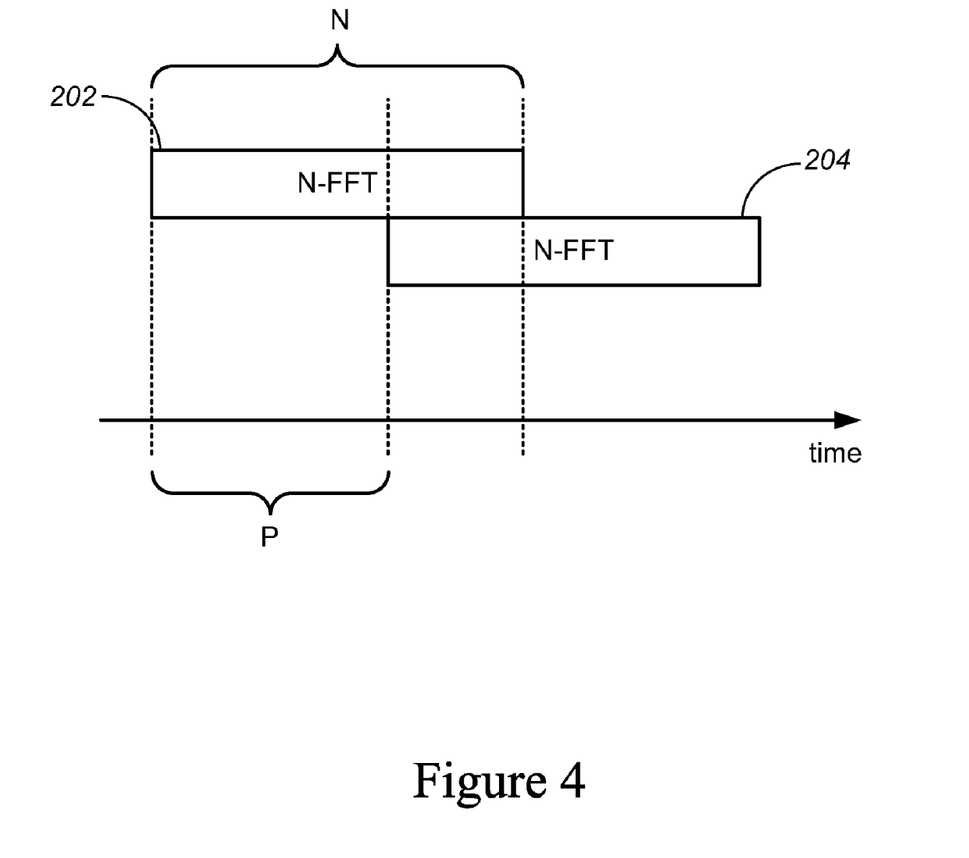
FIG. 4 illustrates a first FFT output and a second FFT output in accordance with one embodiment of the present invention.

In block 106, the phase difference calculation component 18 determines a phase difference between the first FFT output and the second FFT output. One embodiment of a phase difference determination is shown in FIG. 4. A first FFT output 202 and second FFT output 204 that is a successive output to the first FFT output 202 are shown. The first FFT output 202 and second FFT output 204 may be consecutive outputs of signal samples or consecutive outputs of consecutive signal samples when they are obtained consecutively by the ADC and IQ generator component 14. In some embodiments of the present invention, a relatively large number of signal samples may be provided and at least two consecutive signal samples are selected and used to determine the data transmitted by the signal by producing FFT outputs using an FFT component 16. Each of the FFT outputs 202, 204 include its own respective phase. In one embodiment of the present invention, the phase difference of the FFT outputs 202, 204 is determined by subtracting the phase of the first FFT output 202 from the phase of the second FFT output 204.

Other methods may be used to determine a phase difference. The FFT outputs 202, 204 may also include an offset P. The offset P may be determined based on the number of samples performed by the ADC and IQ generator component 14 and is generally the offset, in time, of the second FFT output relative to the first FFT output. In some embodiments of the present invention, a phase difference $\Delta_\Psi$ between the first FFT output 202 and second FFT output 204 is determined using the offset P with the following relationship:

$$\Delta_\Psi = 2\pi \cdot \frac{f}{f_s} \cdot P$$

Where:
f is the signal frequency; and
$f_s$ is the sampling frequency.

Other methods may be used to determine a phase difference when the received signal is at a center channel of the FFT, plus or minus a frequency deviation. The phase difference can be determined using the following relationship:

$$\Delta_\Psi = 2\pi \cdot P \cdot \left(\frac{k}{N} \pm \frac{\Delta_f}{f_s}\right)$$

Where:
k is the channel number;
N is the size of the FFT;
$\Delta_f$ is the frequency deviation of the received signal; and
$f_s$ is the sampling frequency.

In some embodiments, the size of the FFT, N, is the number of channels used in the FFT, which corresponds to the number of samples processed through channels. N may be as low as one and as high as the number of channels available in a particular FFT component used. A one channel FFT may be a low-pass filter based on an accumulator with which the receiver can process one FSK tone and an OFDM signal that is a single carrier signal.

Returning to FIG. 3, the phase difference calculation component 18 determines a bit value of data represented by the received signal in block 108. For example, if the phase difference $\Delta_\Psi$ is positive, it indicates that the received signal represents a bit value of digital 0. If the phase difference $\Delta_\Psi$ is negative, it indicates that the received signal represents a bit value of digital 1. In addition, the magnitude of the phase difference $\Delta_\Psi$ can be used to determine which frequency channel is being used. For example, the system can receive multiple signals modulated using the same or different techniques that at least partially overlap in time. The signals can be processed using different channels in the FFT component 16. The magnitude of the output of the FFT component 16 for each signal can indicate the channel used to process the respective signal. The magnitude can be used to identify the first phase and second phase of a particular signal from the outputs of the FFT component 16 and a phase difference for each signal can be determined.

In block 110, the digital data is provided to an end device 20 associated with the receiver. The end device 20 may collect the digital bit value data and analyze it to understand the information transmitted using the digital bit value data. The end device 20 may include a database, or other storage device, in which the digital bit value data is stored. In some embodiments, the end device 20 includes a processor that can execute program code for analyzing the digital bit value data and translating it into a useable format, such as displaying the information that the digital bit value data represents onto a screen or storing the information.

Alternative Receiver Implementations

Figure 5:
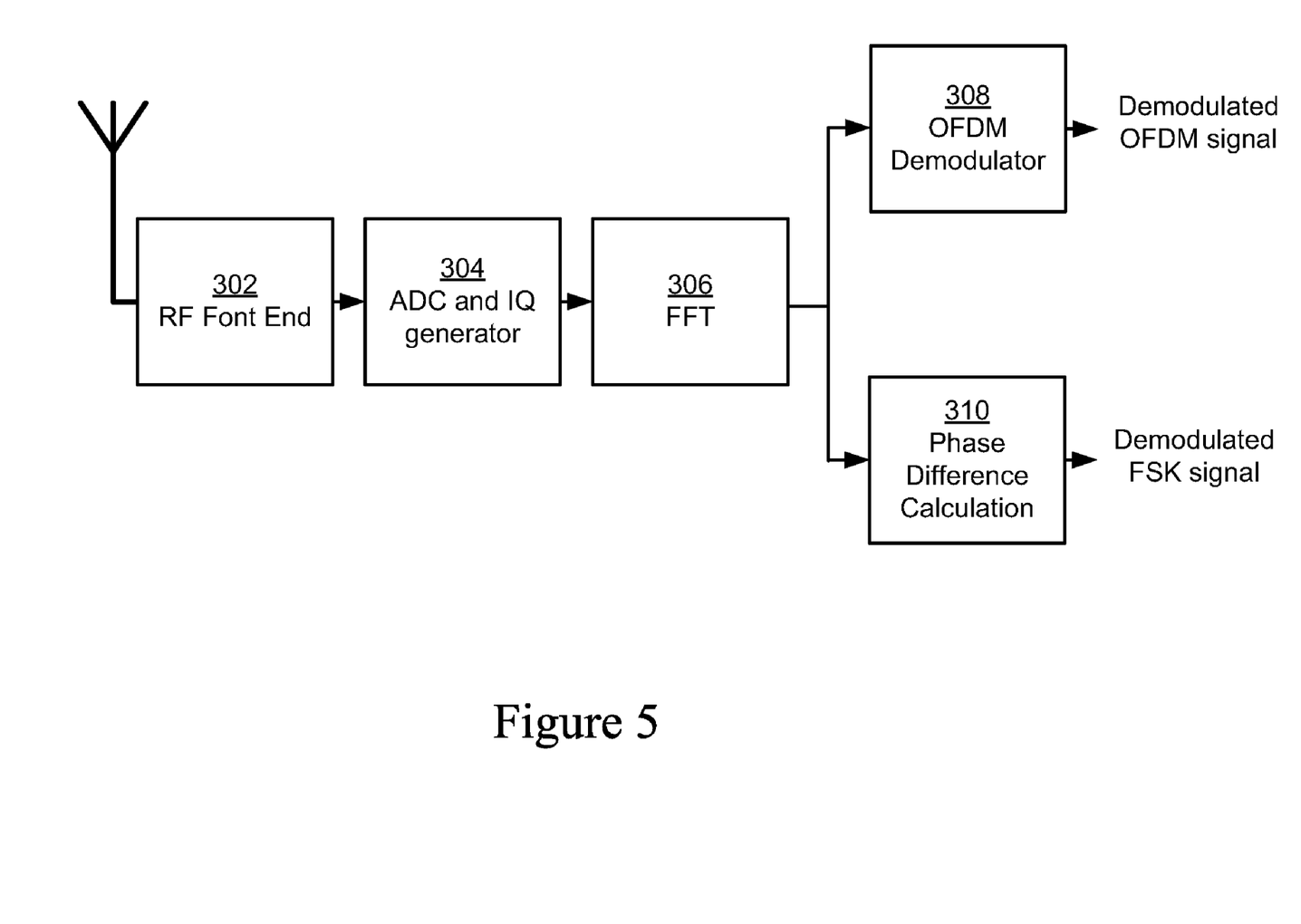
FIG. 5 is a block diagram of a receiver configured to demodulate two signals modulated using different types of modulation techniques according to one embodiment of the present invention.

Certain embodiments of the present invention may be implemented in receivers that are capable of demodulating signals that have been modulated using different techniques. Some embodiments of the present invention are also configured to demodulate two or more signals substantially simultaneously. Such signals may have been modulated using the same or a different technique. An example of one different type of modulation technique is OFDM. FIG. 5 illustrates an embodiment of receiver components that can demodulate frequency or phase modulated signals, such as M-FSK signals, and another type of signal, such as OFDM.

The receiver components in FIG. 5 include an antenna 300 that can detect signals transmitted wirelessly and provide them to an RF front end 302. The antenna 300 can be configured to receive two or more signals substantially simultaneously. In some embodiments, the antenna 300 includes an array of detection elements that can detect signals modulated via various techniques and/or transmitted on different carrier frequencies. In other embodiments, the receiver components are connected via wireline, such as a cable, to the transmitter. The cable can carry signals between the transmitter and receiver.

The RF front end 302 can amplify and filter the received signals and otherwise prepare them for processing by an ADC and IQ generator 304. The ADC and IQ generator 304 can be configured to sample each signal at a pre-set sample rate and output the samples to an FFT component 306. The ADC and IQ generator 304 can be configured to sample two or more received signals substantially at the same time.

The FFT component 306 can perform an FFT algorithm on the samples of each received signal substantially simultaneously. An example of an FFT algorithm is described above with reference to FIG. 3. The FFT algorithm may result in FFT outputs that include complex signals, each including one or more signal attributes. The signal attributes can include frequency, amplitude, and/or phase of each signal sample.

The FFT outputs can be provided to different components for further processing based on the modulation technique used for the received signal. FIG. 5 includes two such components. An OFDM demodulator 308 and phase difference calculation component 310. Received signals can be sent to either the OFDM demodulator 308 or phase difference calculation component 310 depending on the method from which they were modulated. For example, the FFT component 306 can detect the modulation technique and send those signals to the appropriate component.

The phase difference calculation component 310 can be adapted to demodulate signals that have been modulated using frequency or phase modulation techniques such as M-FSK. For example, the phase difference calculation component 310 can demodulate signals in accordance with methods described above with reference with FIG. 3. The OFDM demodulator 308 can demodulate signals modulated using OFDM demodulation techniques. The OFDM demodulator 308 can perform conventional methods used to demodulate OFDM signals.

Illustrative Methods for Using Threshold to Analyze Phase

Figure 6:
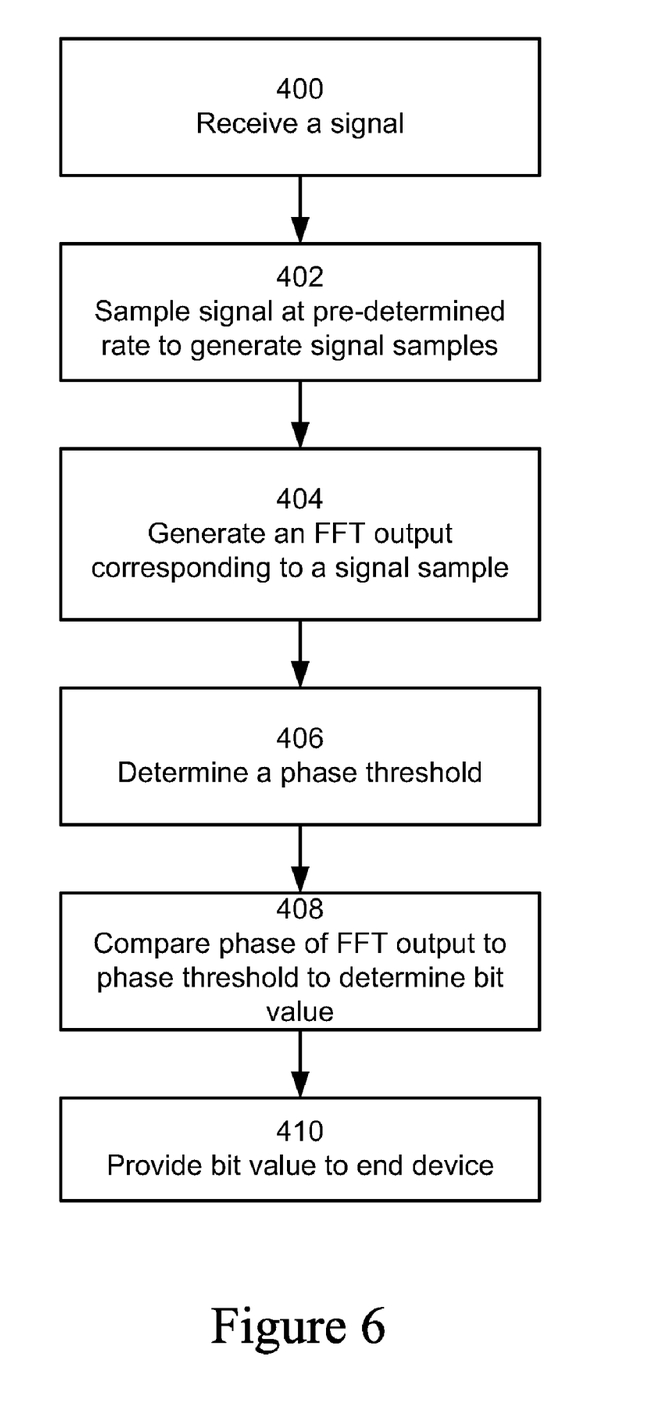
FIG. 6 is a flow chart of a method for determining data within a signal using a threshold according to one embodiment of the present invention.

Transmitter delays and communication mediums, among other things, may cause the phase of transmitted signals to shift. A signal having a phase shift may cause the receiver to experience difficulty in determining the data value included in the signal using phases of FFT outputs in accordance with the embodiment shown in FIG. 4. In some embodiments of the present invention, a phase threshold is determined and FFT outputs are compared to the phase threshold to account for possible phase shifts. In some embodiments of the present invention, the phase threshold is based on phase data obtained from previously received and processed signals and/or signal samples. Alternatively or in addition, the phase threshold may be based on the expected phase difference between two FSK signal phases. FIG. 6 illustrates a method for determining a threshold and using it to determine data values in accordance with one embodiment of the present invention.

The method begins at block 400 when a signal is received. The signal may have been modulated using a phase or frequency modulation techniques such as M-FSK. The signal can include signal attributes, such as frequency, amplitude, and/or phase.

In block 402, the signal is sampled at a pre-determined rate to generate signal samples. The number of signal samples generated may be dependent on the sample rate.

In block 404, an FFT algorithm is performed on signal samples to generate an FFT output that corresponds to each signal sample. Each of the FFT outputs includes signal attributes. The signal attributes can include phase, magnitude, and frequency of the signal.

In block 406, a phase threshold is determined. The phase threshold may be a threshold against which phase information for one or more FFT outputs is compared to determine the data represented by the FFT output. In some embodiments of the present invention, the phase threshold is determined by obtaining an expected phase difference between an FFT output representing a digital 0 and an FFT output representing a digital 1. The expected phase difference may be divided by a sampling frequency, 360 degrees, and a number of FFT output phase differences summed for a received signal. The resulting value may be divided by two to obtain a threshold.

In block 408, a phase of the first and second FFT outputs is compared to the threshold to determine a digital bit value associated with the FFT output. The first and second FFT output phase may be compared to the threshold to determine whether it is above or below the threshold. If the FFT output phase difference is above the threshold, the FFT output represents a digital bit value of 1. If the FFT output phase difference is below the threshold, the FFT output represents a digital bit value of 0.

In block 410, the bit value is provided to an end device. The end device can store the bit value and/or process it to generate usable information.

Exemplary Implementations

The following is a description of an implementation of a system and method according to one embodiment of the present invention. A transmitter is provided that includes components disposed in a digital baseband processor that are capable of modulating data as an FSK signal in a two-way protocol. The digital baseband processor is a field-programmable gate array (FPGA) provided by Altera Corporation of San Jose, Calif. The transmitter is capable of transmitting data at 9600 bits/second and 19200 bits/second. Each bit is represented by a deviation of 5.5 kHz around a center frequency. The center frequency can be a frequency within the range of 902 MHz to 928 MHz. Each channel within the range is spaced by 100 kHz. The FPGA receives a transmit channel and bit values from a computer processing unit (CPU) via a register. The FPGA can synthesize and modulate the bit values and configure amplifiers to support transmission onto a communication medium via an antenna coupled to the FPGA.

A receiver is provided that includes components capable of demodulating FSK modulated signals, including components disposed in a digital baseband processor that is an Altera Cyclone II FPGA provided by Altera Corp. The receiver includes two selectable antennas that are configured to detect FSK signals from a communication medium. The receiver can demodulate signals at 9600 bits/sec and 19200 bits/sec. A computer processing unit (CPU) specifies the channel on which the FPGA components listen for signals to demodulate and selects the antenna to use for receiving signals from a communication medium. The demodulated bits are stored in a register and provided to the CPU. The CPU can reconstruct data packets using the demodulated bits. The CPU may also validate the packets.

The digital baseband processor includes a numerically controlled oscillator (NCO) with dual 8-bit outputs (I and Q) and two multipliers, one for I and one for Q. The inputs to the NCO include 8-bit signed data from an external analog-to-digital converter (ADC) and 7-bit unsigned data defining the frequency to be used by the NCO. The ADC can use an analog intermediate frequency of 36.4 MHz and a sampling frequency of 9.170405 MHz. The frequency to be used by the NCO can be programmed as a frequency within the range of 175.2177 kHz to 365.7139 kHz. Programming precision is 1.5 kHz. Inputs to the multipliers can be sign extended and the output is registered and truncated to and 8-bit signed number.

The digital baseband processor also includes an accumulator that is a 1-channel FFT. The accumulator receives the output of the multipliers and outputs the sum of 191 consecutive input data on two 16-bit values. Periodically, such as one out of every 20 accumulator processes, an extra sample is added with a result of sum of 192 outputted to resynchronize the accumulator with a data rate of 9600 bits/sec.

The digital baseband processor also includes a phase detection component that can determine the phase of the I and Q inputs. The I and Q inputs are monitored for negative values. Any negative values are converted to positive values to fold inputs from a range of 0 to 360 degrees to one quadrant that includes phases in the 0 to 90 degree range. The tangent is then calculated to fold the inputs in the 45 to 90 degrees range to the 0 to 45 degrees range. A resulting quotient can be used as an address into an arctan lookup table that spans the range of 0 to 45 degrees. The initial signal value of the I and Q inputs, I and Q magnitude comparison result, and the quotient in the lookup table can be used to determine a phase over a 0 to 360 range. The phase can be available in two formats: (1) an 11-bit value with 0 corresponding to 0 degrees and 0x7FF corresponding to almost 360 degrees; or (2) a 9-bit value representing an integer angle result from 0 to 359.

The digital baseband processor also includes a data detection component that can detect data bits from phase changes. The data detection component can tolerate an NCO frequency that is off frequency relative to two FSK frequencies. A vector rotation is first determined from adjacent input phase data and data bits are determined from multiple vector rotation values. The change in phase is determined from the last phase value to the current phase value. The change in phase is a signed value that is less than 180 degrees per period to allow an accurate detection of rotation when the phase angle crosses the 0/360 boundary from either direction (clockwise or counterclockwise). When the boundary is crossed, an adjustment is made to the phase change. A shift register can be used to store nine signed phase change values. Eight (four oldest and four newest) of the nine phase change values can be used by a correlator. The correlator width can be increased by three bits relative to the phase difference values. The correlator multiplies the four oldest phase change values by −1 and multiples the four newest phase change values by 1. The magnitude of the correlator output is compared to a reference value to determine if a valid data bit transition exists.

The digital baseband processor also determines when a data bit is to be outputted. It can determine a sign and magnitude of the correlation result. The sign and magnitude in a three-position shift register are shifted. The sign and magnitude of the middle shift register entry is compared to (1) the signs and magnitudes in the other two entries to determine if the middle entry includes a local minimum or maximum; and (2) a threshold that is set to ½ of the expected result, such as the FSK frequency difference. Based on the comparison, the digital baseband processor can determine whether the middle entry includes a result that represents a transition in phase difference values or a data bit transition. The shift register is updated with the result from the phase difference detection. A tracking counter is also updated. A majority vote is performed on bits in the shift register to determine whether the corresponding data bit is a digital 0 or digital 1. A signal is provided indicating that a data bit is available.

The digital baseband processor also includes a magnitude threshold calculation component that determines a magnitude threshold value based on the expected frequency difference between the two FSK frequencies using the following relationship:

$$magThreshold = fskFreqDiff \times 8.5$$

Where:
magThreshold is the magnitude threshold value;
fskFreqDiff is the expected difference, in Hz, between the digital 0 and digital 1 FSK frequencies; and
8.5 is a rounded constant value that represents 360 degrees of phase difference at the input multiplied by the number of pairs of phase difference summed by the correlator and divided by the rate at which the sample phase difference is evaluated, in Hz, and divided by a reduction of threshold to ½ of the expected maximum correlator output.

The digital baseband processor also includes a data bit calculation component that performs bit value decisioning based on the value of the latest successive phase rotations. A shift register stores a digital 1 or a digital 0 that corresponds to successive phase difference values. Bits 0 and 1 of the shift register are monitored for data transitions. A counter is used to track the phase change values that correspond to a data bit period. The counter increments each time a phase change value is calculated.

After a digital 1 or digital 0 value is assigned to a sample phase difference, it is shifted to the least significant bit of the shift register. A data bit is derived from the values in shift register bits 7:3 every five sample periods. A majority vote is performed over the five values in bits 7:3 of the shift register to determine the value of the corresponding data bit.

General

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application to enable others skilled in the art to utilize the invention and various embodiments and with various modifications as are suited to the particular use contemplated. Alternative embodiments will become apparent to those skilled in the art to which the present invention pertains without departing from its spirit and scope.

What is claimed is:

1. A system for recovering data from at least one signal, the system comprising:
    an analog-to-digital converter (ADC) and in-phase/quadrature (IQ) generator component, comprising a processor, configured to sample a signal recovered from a communication medium on which the signal is propagating to generate a first signal sample and a second signal sample;
    a Fast Fourier Transform (FFT) component coupled to the ADC and IQ generator component, the FFT component being configured to process the first signal sample to generate a first signal phase and process the second signal sample to generate a second signal phase, wherein the FFT component comprises a first channel and a second channel, the first channel being configured to process the first signal sample and the second signal sample, the second channel being configured to process at least two samples from a second signal to generate at least two phases for the second signal, wherein processing the at least two samples from the second signal at least partially overlaps processing the first signal sample or processing the second signal sample; and
    a phase difference calculation component coupled to the FFT component, the phase difference calculation component being configured to:
    determine a phase difference between the first signal phase and the second signal phase;
    determine a bit value represented by the signal based on the phase difference; and
    output the bit value to an end device coupled to the phase difference calculation component.

2. The system of claim 1, wherein the phase difference calculation component is configured to determine the phase difference between the first signal phase and the second signal phase by subtracting the first signal phase from the second signal phase.

3. The system of claim 1, wherein the ADC and IQ generator component is configured to determine a time offset for the first signal sample and the second signal sample based on a number of signal samples generated by the ADC and IQ generator component; and
    wherein the phase difference calculation component is configured to determine the phase difference using a frequency of the signal, a sampling frequency of the ADC and IQ generator component, and the time offset.

4. The system of claim 1, wherein the phase difference calculation component is configured to determine the bit value represented by the signal based on the phase difference by:
    identifying a sign of the phase difference;
    determining the bit value is a digital 0 if the sign of the phase difference is positive; and
    determining the bit value is a digital 1 if the sign of the phase difference is negative.

5. The system of claim 1, wherein the FFT component is configured to process the first signal sample to generate the first signal phase and process the second signal sample to generate the second signal phase by performing an FFT algorithm on the first signal sample to generate the first signal phase and performing the FFT algorithm on the second signal sample to generate the second signal phase.

6. The system of claim 1, further comprising a radio frequency (RF) front end component coupled to the ADC and IQ generator component, the RF front end component being configured to amplify the signal recovered from the communication medium and provide an amplified signal to the ADC and IQ generator component.

7. The system of claim 1, where the phase difference is a first signal phase difference and the bit value is a first signal bit value, the system further comprising the ADC and IQ generator component is configured to sample the second signal recovered from the communication medium on which the second signal is propagating to generate the at least two samples from the second signal; and
    wherein the phase difference calculation component is configured to:
    determine a second signal phase difference between the at least two phases for the second signal;
    determine a second signal bit value based on the second signal phase difference; and
    output the second signal bit value to an end device coupled to the phase difference calculation component.

8. A system for recovering data from at least two signals, the system comprising:
    an analog-to-digital converter (ADC) and in-phase/quadrature (IQ) generator component, comprising a processor, configured to sample a first signal modulated by a first technique to generate a plurality of first signal samples and sample a second signal modulated by a second technique to generate a plurality of second signal samples, the first signal and the second signal being recovered from a communication medium on which the first signal and the second signal are propagating;
    a Fast Fourier Transform (FFT) component coupled to the ADC and IQ generator component, the FFT component being configured to process the plurality of first signal samples to generate at least two first signal phases and process the plurality of second signal samples to generate at least two second signal phases, wherein processing the plurality of first signal samples at least partially overlaps processing the plurality of second signal samples;
    a phase difference calculation component coupled to the FFT component, the phase difference calculation component being configured to determine a first signal bit value based on a phase difference between the at least two first signal phases and output the first signal bit value; and
    a demodulator coupled to the FFT component, the demodulator being configured to demodulate the second signal using the at least two second signal phases to determine a second signal bit value and output the second signal bit value.

9. The system of claim 8, wherein the first signal is a frequency shift keying (FSK) modulated signal and the second signal is a orthogonal frequency division multiplexing (OFDM) modulated signal; and wherein the demodulator is an OFDM demodulator.

10. The system of claim 9, wherein the FFT component is configured to:

provide the at least two first signal phases to the phase difference calculation component by determining the first signal is the FSK modulated signal; and provide the at least two second signal phases to the OFDM demodulator by determining the second signal is the OFDM modulated signal.

11. The system of claim 8, wherein the ADC and IQ generator component is configured to determine a time offset for the plurality of first signal samples based on a number of signal samples generated by the ADC and IQ generator component for the first signal; and wherein the phase difference calculation component is configured to determine the phase difference using a frequency of the first signal, a sampling frequency of the ADC and IQ generator component, and the time offset.

12. The system of claim 8, wherein the phase difference calculation component is configured to determine the first signal bit value represented by the first signal based on the phase difference by:

identifying a sign of the phase difference;

determining the first signal bit value is a digital 0 if the sign of the phase difference is positive; and determining the first signal bit value is a digital 1 if the sign of the phase difference is negative.

13. The system of claim 8, wherein the FFT component is configured to process the plurality of first signal samples to generate at least two first signal phases and process the plurality of second signal samples to generate at least two second signal phases by performing an FFT algorithm on the plurality of first signal samples to generate the at least two first signal phases and performing the FFT algorithm on the plurality of second signal samples to generate the at least two second signal phases.

14. The system of claim 8, wherein the FFT component is configured to determine a phase threshold based on an expected phase difference between the at least two first signal phases, the expected phase difference being based on a difference of a digital 0 signal phase and a digital 1 signal phase; and wherein the phase difference calculation component is configured to determine the first signal bit value by comparing the phase difference to the phase threshold.

15. A method for recovering data from at least one signal, the method comprising:

sampling a signal recovered from a communication medium on which the signal is propagating to generate a first signal sample and a second signal sample;

processing the first signal sample to generate a first signal phase;

processing the second signal sample to generate a second signal phase;

processing the first signal sample and the second signal sample by a first channel of an Fast Fourier Transform (FFT) component;

processing at least two samples from a second signal by a second channel of the FFT component to generate at least two phases for the second signal, wherein processing the at least two samples from the second signal at least partially overlaps processing the first signal sample or processing the second signal sample;

determining a phase difference between the first signal phase and the second signal phase;

determining a bit value represented by the signal based on the phase difference; and outputting the bit value.

16. The method of claim 15, wherein determining the phase difference between the first signal phase and the second signal phase comprises subtracting the first signal phase from the second signal phase.

17. The method of claim 15, further comprising determining a time offset for the first signal sample and the second signal sample based on a number of signal samples generated by sampling the signal; and wherein determining the phase difference comprises using a frequency of the signal, a sampling frequency, and the time offset.

18. The method of claim 15, wherein determining the bit value represented by the signal based on the phase difference comprises:

identifying a sign of the phase difference;

determining the bit value is a digital 0 if the sign of the phase difference is positive; and determining the bit value is a digital 1 if the sign of the phase difference is negative.

19. The method of claim 15, wherein processing the first signal sample to generate the first signal phase comprises performing an FFT algorithm on the first signal sample to generate the first signal phase; and wherein processing the second signal sample to generate the second signal phase comprises performing the FFT algorithm on the second signal sample to generate the second signal phase.

20. The method of claim 15, wherein the phase difference is a first signal phase difference and the bit value is a first signal bit value, the method further comprising:

sampling the second signal to generate the at least two samples from the second signal;

determining a second signal phase difference between the at least two phases for the second signal; determining a second signal bit value based on the second signal phase difference; and outputting the second signal bit value.

* * * * *